(12) United States Patent
Albertson et al.

(10) Patent No.: US 9,002,897 B2
(45) Date of Patent: Apr. 7, 2015

(54) ASPECTED INTERFACES AND METHODS FOR SYNCHRONIZED CONTAINERS AND OTHER DATA STRUCTURES

(75) Inventors: John-Mark Albertson, Redmond, WA (US); Douglas Kevin Service, Bothell, WA (US); Richard A. Molloy, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 1 day.

(21) Appl. No.: 12/979,827

(22) Filed: Dec. 28, 2010

(65) Prior Publication Data

US 2012/0166408 A1 Jun. 28, 2012

(51) Int. Cl.
*G06F 7/00* (2006.01)
*G06F 17/30* (2006.01)
*G06F 9/52* (2006.01)

(52) U.S. Cl.
CPC ........................ *G06F 9/52* (2013.01)

(58) Field of Classification Search
USPC ................................................ 707/796, 781
See application file for complete search history.

(56) References Cited

U.S. PATENT DOCUMENTS

| | | | | |
|---|---|---|---|---|
| 5,287,521 A * | 2/1994 | Nitta et al. | ..................... | 710/200 |
| 7,389,291 B1 | 6/2008 | Shavit et al. | | |
| 2004/0168175 A1* | 8/2004 | Anantharao | .................. | 719/315 |
| 2005/0131899 A1* | 6/2005 | Dvorkin et al. | .................... | 707/8 |
| 2007/0067349 A1 | 3/2007 | Jhaveri et al. | | |
| 2009/0044174 A1 | 2/2009 | Dolby et al. | | |
| 2009/0063783 A1 | 3/2009 | von Praun et al. | | |
| 2009/0300649 A1* | 12/2009 | Gopal et al. | .................. | 719/313 |

OTHER PUBLICATIONS

Franch, et al., "A Quality Model for the Ada Standard Container Library", Retrieved at <<http://citeseerx.ist.psu.edu/viewdoc/download?doi=10.1.1.95.5735&rep=rep1&type=pdf>>, 2003, 14 pages.
Bachle, et al., "The Real Performance Drivers Behind XML Lock Protocols", Retrieved at <<http://wwwlgis.informatik.uni-kl.de/cms/fileadmin/publications/2009/BH09.DEXA.pdf>>, 2009, 15 pages.
Calisi, et al., "Openrdk: A Framework for Rapid and Concurrent Software Prototyping", Retrieved at <<http://www.dis.uniroma1.it/~calisi/papers/nardi08secesa.pdf>>, 2008, 6 pages.

(Continued)

*Primary Examiner* — Hosain Alam
*Assistant Examiner* — Van Oberly
(74) *Attorney, Agent, or Firm* — Steve Wight; Judy Yee; Micky Minhas (57) ABSTRACT

The subject disclosure is directed towards an object (e.g., an aspected vector, queue, map, stack and so forth) container having an exclusive interface, a shared-read-only interface and a shared-write (and read) interface to a common set of data. Use cases during runtime determine the appropriate interface to use. No locking is needed with methods of the exclusive interface or the read-only interface. The shared-write interface is configured to have only concurrency safe methods. Also described is blocking the use of other interfaces while one interface is in use, and the use of reference counter tracking to know when no concurrent readers and/or writers remain, to allow transitioning to use a different interface.

19 Claims, 6 Drawing Sheets

(56) References Cited

OTHER PUBLICATIONS

Schmidt, Douglas C., "Transparently Parameterizing Synchronization into a Concurrent Distributed Application", Retrieved at <<http://citeseerx.ist.psu.edu/viewdoc/download?doi=10.1.1.48.4735&rep=rep1&type=pdf>>, Retrieved Date: Sep. 9, 2010, 9 pages.

"Parallel Containers and Objects", Retrieved at <<http://msdn.microsoft.com/en-us/library/dd504906.aspx>>, Retrieved Date: Sep. 9, 2010, 5 pages.

"System.Collections.Concurrent Namespace", Retrieved at http://msdn.microsoft.com/en-us/library/dd287108.aspx, Retrieved Date: Sep. 9, 2010, 1 page.

"concurrent_vector Class", Retrieved at <<http://msdn.microsoft.com/en-us/library/ee355343.aspx>>, Retrieved Date: Sep. 9, 2010, 4 pages.

"Code samples for the Concurrency Runtime and Parallel Pattern Library in Visual Studio 2010", Retrieved at <<http://code.msdn.microsoft.com/concrtextras>>, Retrieved Date: Sep. 9, 2010, 1 page.

Albrecht, Tony, "Pitfalls of Object Oriented Programming", Retrieved at <<https://docs.google.com/viewer?url=http://research.scee.net/files/presentations/gcapaustralia09/Pitfalls_of_Object_Oriented_Programming_GCAP_09.pdf>>, Retrieved Date: Sep. 9, 2010, 114 pages.

"Implementing Dekker's algorithm with Fences", Retrieved at <<http://www.justsoftwaresolutions.co.uk/threading/implementing_dekkers_algorithm_with_fences.html>>, Jul. 27, 2010, pp. 4.

\* cited by examiner

ASPECTED INTERFACES AND METHODS FOR SYNCHRONIZED CONTAINERS AND OTHER DATA STRUCTURES

BACKGROUND

When data structures such as containers are intended to be used in a concurrent/multi-threaded environment, a performance/productivity problem arises. More particularly, to achieve thread-safety, many concurrent versions of objects, containers, and other data structures offer a non-restricted interface that has poor performance due to coarse synchronization. The current alternative, the mixed interface, offers a single interface with a mix of fine grain synchronized and unsynchronized methods with slightly better performance, but this corresponds to a productivity problem since the user is required to provide synchronization for many of the unsynchronized (unsafe) methods. Moreover, although this alternative has slightly better performance, it still provides reduced performance relative to the serial and read-only equivalents. The alternative also results in reduced developer productivity due to the difficulty of the user having to ensure and provide synchronization of the unsynchronized (unsafe) methods.

As a result, developers are forced to make a tradeoff between either the mixed interface with reduced productivity (and somewhat reduced performance) alternative, or significantly reduced performance in the exclusive, coarsely-synchronized alternative.

SUMMARY

This Summary is provided to introduce a selection of representative concepts in a simplified form that are further described below in the Detailed Description. This Summary is not intended to identify key features or essential features of the claimed subject matter, nor is it intended to be used in any way that would limit the scope of the claimed subject matter.

Briefly, various aspects of the subject matter described herein are directed towards a technology by which an object (e.g., an aspected vector, aspected stack, aspected queue or aspected map container) contains an exclusive interface (non-concurrent), a shared-read-only interface (concurrent) and a shared-read-write (concurrent) interface to a common set of data. The interface that is chosen is based upon the current use case, which allows the synchronization semantics on the data to vary with the use case.

The exclusive interface provides exclusive access to the methods for accessing the object's data. Only one holder exists at a time, and the holder can perform any action (complete read and write access exists) on the object, with high performance. Synchronization in the exclusive interface case is provided at the level of the interface so that synchronization overhead is not incurred within each interface method invocation. There is no concurrency via the exclusive interface, and other requests to retrieve an interface will block or fail based on the requester's options submitted with the request, until the exclusive interface is released.

The shared-read-only interface (or more simply "read-only" interface) provides methods for accessing the data via a plurality of simultaneous readers. Like the exclusive interface, synchronization is provided at the level of the interface and multiple interface methods can be invoked sequentially in a single read-only interface or concurrently between multiple read-only interfaces with no synchronization overhead. The holders can only read, and there is no exclusive or shared-write allowed concurrently, however this interface provides high performance and high concurrency for readers.

The shared-read-write interface (or more simply "shared-write interface," which allows writers and readers) provides methods for accessing the data via a plurality of simultaneous writers, at high concurrency with lower performance. The holders can perform restricted writes, and any reads. In this case, synchronization is provided at the method level and sequential calls to the same concurrent interface are less performant than calling the same methods through the exclusive interface or shared-read interface.

In one aspect, the exclusive interface is configured with non-concurrency safe methods, while the shared-write interface is configured to have no non-concurrency safe methods. Shared-write interface method calls are internally synchronized. While one or more shared-write interfaces exist, access to the other interfaces is blocked; a mechanism tracks references to shared-writer interfaces to determine when to allow access to the other interfaces. When the exclusive interface is retrieved, access is blocked to the shared-write interface and shared-read interface. Only one exclusive interface is allowed at a time. When the shared-read interface is obtained, access is blocked to the exclusive interface and shared-read interface; the object includes a mechanism for tracking references to the number of shared-read interfaces or shared-write interfaces to determine when to allow access via another interface.

In one aspect, no synchronization occurs when a method is invoked via the exclusive interface. No synchronization occurs when a method is invoked via a shared-read interface.

Other advantages may become apparent from the following detailed description when taken in conjunction with the drawings.

BRIEF DESCRIPTION OF THE DRAWINGS

The present invention is illustrated by way of example and not limited in the accompanying figures in which like reference numerals indicate similar elements and in which.

DETAILED DESCRIPTION

Various aspects of the technology described herein are generally directed towards configuring a data structure such as a container (e.g., a vector, stack, queue or map) with different interfaces such that the container's storage is separate from its access methods. This use of different interfaces allows the runtime option of working with a container concurrently (including a shared-write mode and shared-read-only mode) or working with the container in an exclusive (serial) mode. In this way, developers can choose at runtime to use an interface for performance, for productivity or somewhere in between.

In one aspect, the technology provides multiple interfaces to the same set of data based on the use case, which allows the synchronization semantics on the data to vary with the use case. In a use case where simultaneous modifications to the data can occur, there is a restricted interface, the shared-write interface, providing slightly slower access. In read-only and exclusive access use cases, the container provides the full performance of the serial equivalent via the shared-read-only and exclusive interfaces. In a serial access use case, a full interface to the container is provided by the exclusive interface. In a read-only use case the shared-read interface is used and is a restricted interface, however the performance of a non-concurrent container is retained because synchronization occurs at the interface level; memory barriers and synchronization are not needed at the method level.

At the same time, the technology ensures that conflicting use cases are not active at the same point in time, by tracking references and coordinating access to these interfaces. Further, the methods available through each interface are configured in a way that does not permit improper use of a method, e.g., the only methods available via the concurrent interface are concurrency-safe methods.

It should be understood that any of the examples herein are non-limiting. Indeed, the concept of using interfaces with different levels of tradeoff between concurrency and performance is applicable to any objects, including in a highly-parallel programming environment. As such, the present invention is not limited to any particular embodiments, aspects, concepts, structures, functionalities or examples described herein. Rather, any of the embodiments, aspects, concepts, structures, functionalities or examples described herein are non-limiting, and the present invention may be used various ways that provide benefits and advantages in computing in general.

By way of general background, consider the example below where a vector container contains (at least two elements), which are set by the push_back method to 3 and 1:

```
#include <vector>
using namespace ::std;
...
main( )
{
    vector<int> vec;
    vec.push_back(3);
    vec.push_back(1);
    cout << vec[0];
}
...
```

The output (cout) will be '3' which is stored at vector element [0]. Note that this general example works fine for serial code, because there is no concurrent writing.

For this to operate as a concurrent vector, however, synchronization is required to prevent one thread's write from interfering with another's write. One such thread-safe concurrent vector with a concurrent Interface is 'concurrent_vector': (http://msdn.microsoft.com/en-us/library/ee355343.aspx). This vector includes a similar push_back method that appends an item to the end of the concurrent vector, but has internal synchronization to make the push_back method concurrency safe. However, some of the methods in the concurrent_vector container are not concurrency safe; for example, the resize method to change the size of the vector is not concurrency safe. Other methods that are unsafe on a concurrent_vector (in one mixed-interface implementation) include clear, reserve, resize, swap and operator=(overloaded assignment operator). The programmer has to properly use locks or otherwise code a program to ensure that only one thread can call a non-concurrency safe method at a time.

As another example, one concurrent_queue implementation includes clear, unsafe_size, usafe_begin, usafe_end, unsafe_front methods that are not concurrency safe. Other containers have different sets of unsafe methods, such as the clear method, which is also present on a queue container, map container, stack container and so forth.

As used herein, the interfaces of a container or other object are described according to use case/interface pairs, namely a 'shared-read-only interface' an 'exclusive interface' or a 'shared-write interface' and each is a valid interface over the raw data. However, instances of these interfaces cannot coexist with each other at the same point in time and are mutually exclusive.

Figure 1:
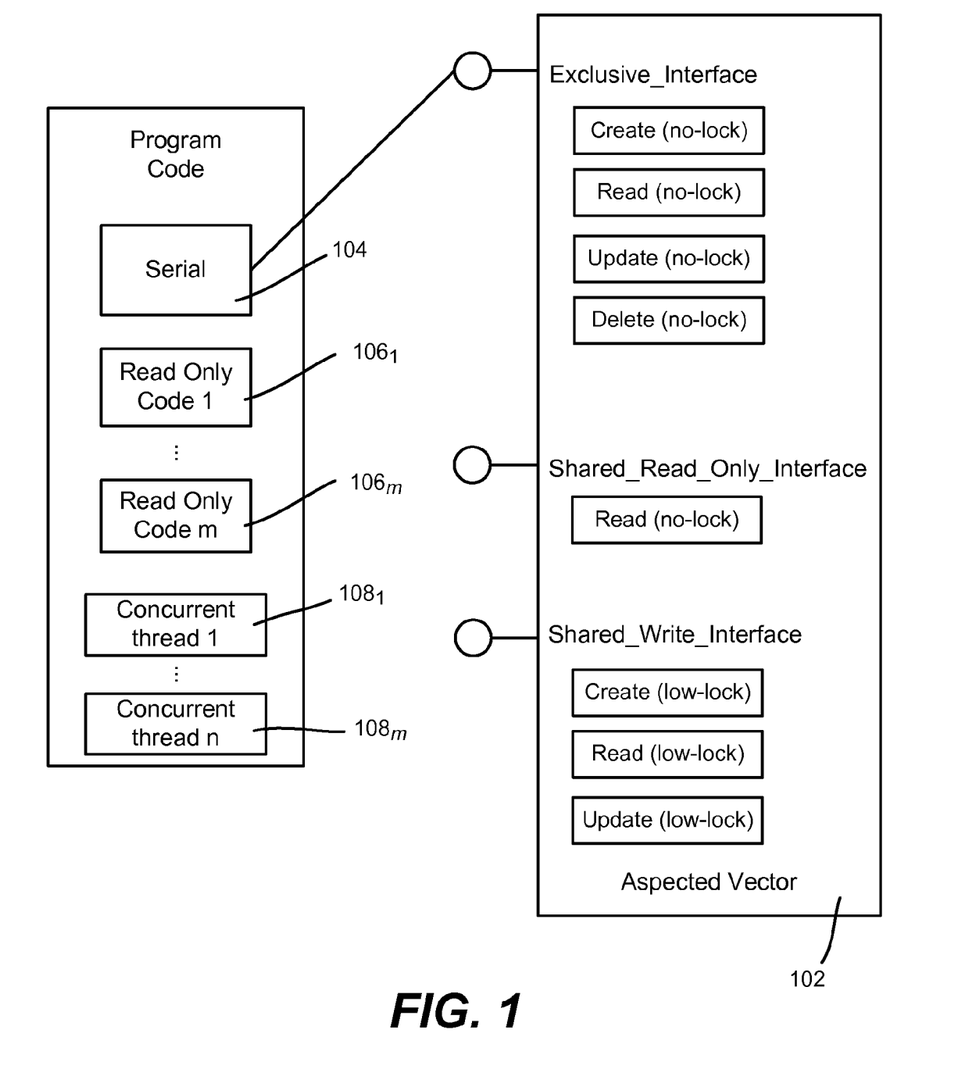
FIGS. 1-3 are representations of object interfaces corresponding to an aspected vector container object being accessed by respective different use cases.
Figure 2:
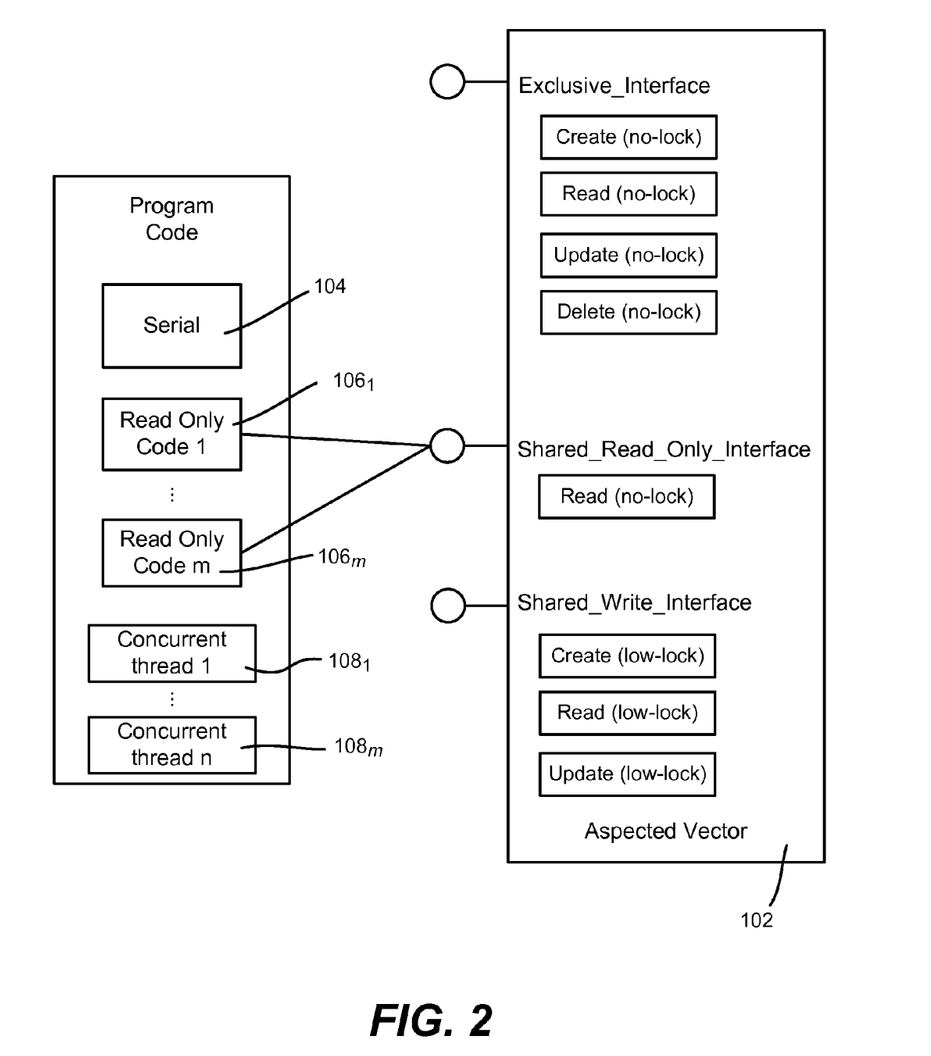
Figure 3:
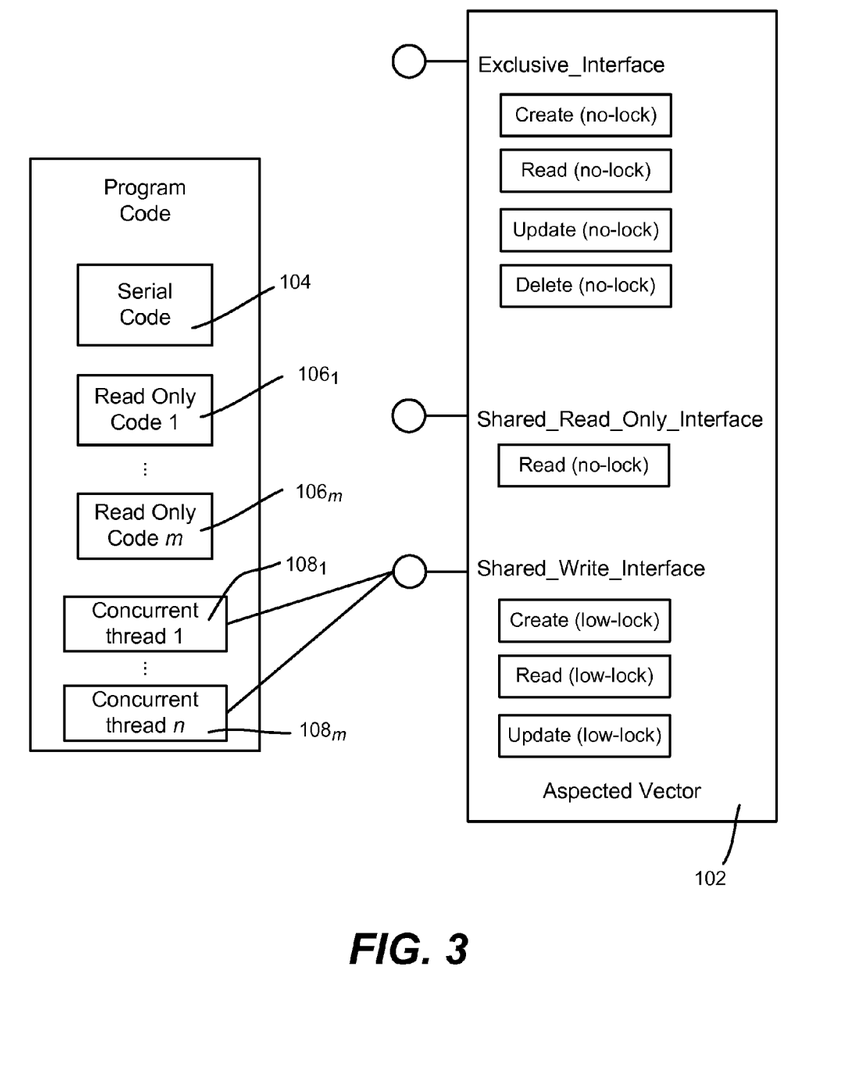

The technology described herein provides these different interfaces to the same container, referred to as an aspected container. In the example of FIGS. 1-3, the container comprises a vector, and such a container is referred to as an aspected vector 102, e.g., aspected_vector. The programmer determines which use case is appropriate at any given time, and selects a corresponding interface.

Containers and other data structures often have interfaces that support CRUD: Create (or insert), Read, Update, Delete operations on the internal data. The exclusive interface supports the full CRUD functionality. The shared-read-only interface offers only Read functionality. With the shared-write interface, the subset of CRUD changes based on the container, as described below.

Note that in contrast, conventional concurrent methods are internally synchronized by a low lock or lock-free solution, and support a restricted use of Create+Read+Update (CRU), or Create+Update+Delete (CUD), but there is not believed to be a correct solution on all hardware platforms that offers a full CRUD interface. For example, the conventional concurrent_vector container supports Create+Read+Update. Note that the Delete functionality is not accessible in a 'safe' manner while the container is being worked with concurrently, and rather than removing individual elements, the entire vector can only be cleared. Further, with the conventional interface, even after the concurrent_vector has been 'grown', concurrent reads still require memory barriers or fences in the interface for correctness, because the vector may be grown. In certain hardware architectures with relaxed memory models, the performance impact is significant when compared to the exclusive interface described herein.

FIGS. 1-3 are representations of the aspected vector 102 with multiple interfaces, each accessed by program code corresponding to different use cases, as well as how CRUD is supported for each. As can be seen in FIGS. 1-3, the programmer determines which interface is appropriate for the current use case, corresponding to currently executing program code, e.g., serial code 104 (FIG. 1), read-only code $106_1$-$106_m$ (FIG. 2), and concurrent code (threads) $108_1$-$108_n$ (FIG. 3).

Figure 4:
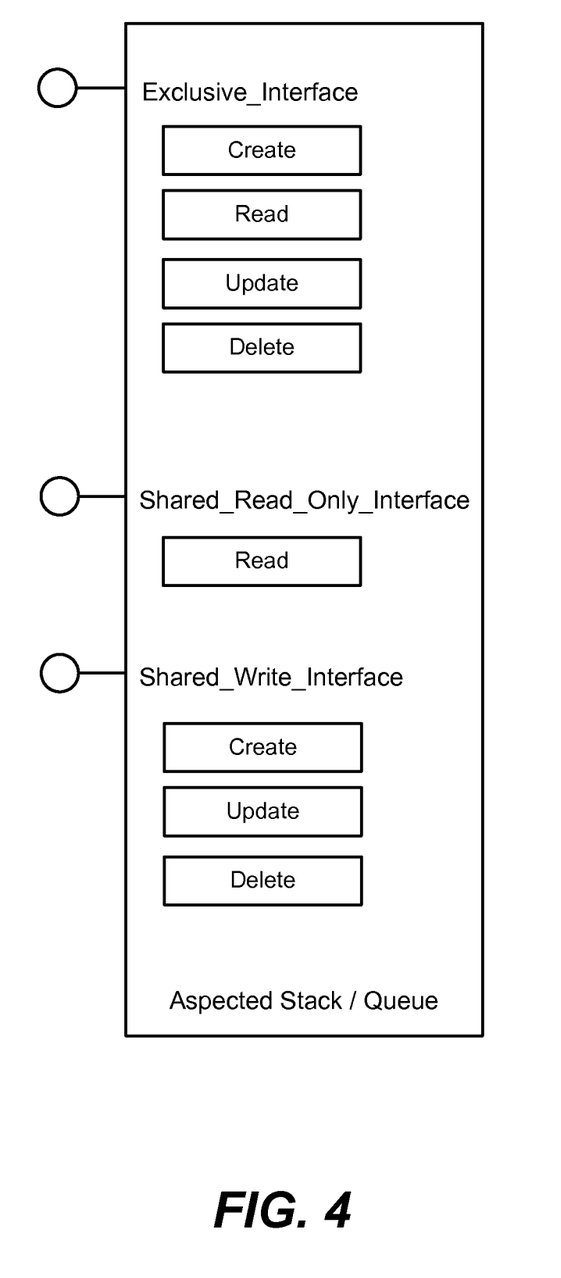
FIG. 4 is a representation of object interfaces corresponding to an aspected queue or stack container object.

FIG. 4 shows potential interfaces for a concurrent stack or queue, as well as how CRUD is supported for each. The specifics of the subset of the CRUD interface changes based on the container. For example, at times the ConcurrentInterface may look like:

(concurrent_vector today)
       Create
       Update
       Delete
    Other times the ConcurrentInterface may look like:
    (concurrent_queue today)
       Create
       Read
       Update And (relatively rarely) the ConcurrentInterface may look like:
(concurrent_hash_map speculated)
Create
Update
Delete
Limited Read By tracking the lifetimes of the interfaces, it is possible to safely transition between use cases. For example, it is possible to transition from a concurrent write case for the aspected vector to the concurrent read-only use case, and to offer the user the shared-read-only interface that has the memory barriers removed (because they are not needed in a read-only case). This transition can happen once all instances of the shared-write interface are no longer being used.

Furthermore, it is safe to transition from the read-only use case to the serial use (exclusive interface) case, and thereby provide the developer with a fully featured and performant serial interface (also with barriers removed). Note that using the exclusive interface blocks access to the shared-write interface and the shared-read-only interface until the exclusive interface is no longer being used.

The following commented pseudocode shows how a shared-write interface operates in general for a shared-write interface that is requested in the program code, e.g., cvec=v.get_writer, which is created on the stack if not blocked because of another interface being in use. Note that the methods available in the shared-write interface are internally synchronized and concurrency safe (e.g., the resize method and clear method do not exist), which protects against programming errors:

```
void foo( )
{
    aspected_vector<int> av;
    parallel for(int i = 0; i < 1000; ++i)
    {
        // Retrieve a concurrent writer.
        // Multiple writers can exist simultaneously.
        aspected_vector<int>::shared_write_interface writer =
        av.get_shared_writer( );
        // Method calls that modify the vector are internally
        synchronized.
        writer.push_back (i);
    }
}
```

When done, the shared-writer is implicitly destroyed as it goes out of scope, and, for example, the exclusive interface may be used when no shared-writers remain.

The following commented pseudocode shows how the exclusive interface operates in general for an aspected vector:

```
void fooSerial( )
{
    aspected_vector<int> av;
    aspected_vector<int>::exclusive_interface vec =
        av.get_exclusive_writer( );
    // vec behaves just like std::vector the serial
    // version, all other interfaces on av are unavailable.
    // The vector can be resized and other non-concurrent
    // methods are availalble due to exclusive, serial, non-concurrent
    access
    vec.resize(42);
    for(int i = 0; i < 42; ++i)
        vec.push_back(i);
    // Iteration and access are unsynchronized in the exclusive interface
    and
    // offer performance equivalent to serial methods
```

```
    foreach(int i in vec)
        cout << vec [i] << endl;
}
```

The following commented pseudocode shows how a shared-read-only interface operates in general for a shared-reader:

```
void CopyFoo( )
{
    // Two aspected vectors source & destination.
    aspected_vector<int> sourceVec, destVec;
    // Assume source is filled with data.
    ...
    aspected_vector<int>::shared_read_interface reader =
    sourceVec.get_shared_reader( );
    // Fill up the destination vector concurrently, using an unordered
    parallel copy
    parallel for(int i = 0; i < reader.size( ); ++i)
    {
        // The reader is shared and multiple shared-writers can be
        obtained
        // from destination.
        aspected_vector<int>::shared_write_interface writer =
            destVec.get_shared_writer( );
        writer.push_back(reader[i]);
    }
}
```

As can be seen, there is provided an object with exclusive, shared-write and shared-read-only interfaces, each interface having appropriate associated methods for accessing the same container data. When not working concurrently, barriers and synchronizations operations are not needed, nor does the way in which the data is stored need to change, whereby most lookups and reads need not be slowed down. This is advantageous with objects that are frequently read but seldom updated concurrently, e.g., containers for maps, hash tables and other objects or data structures.

Exemplary Networked and Distributed Environments

One of ordinary skill in the art can appreciate that the various embodiments and methods described herein can be implemented in connection with any computer or other client or server device, which can be deployed as part of a computer network or in a distributed computing environment, and can be connected to any kind of data store or stores. In this regard, the various embodiments described herein can be implemented in any computer system or environment having any number of memory or storage units, and any number of applications and processes occurring across any number of storage units. This includes, but is not limited to, an environment with server computers and client computers deployed in a network environment or a distributed computing environment, having remote or local storage.

Distributed computing provides sharing of computer resources and services by communicative exchange among computing devices and systems. These resources and services include the exchange of information, cache storage and disk storage for objects, such as files. These resources and services also include the sharing of processing power across multiple processing units for load balancing, expansion of resources, specialization of processing, and the like. Distributed computing takes advantage of network connectivity, allowing clients to leverage their collective power to benefit the entire enterprise. In this regard, a variety of devices may have applications, objects or resources that may participate in the resource management mechanisms as described for various embodiments of the subject disclosure.

Figure 5:
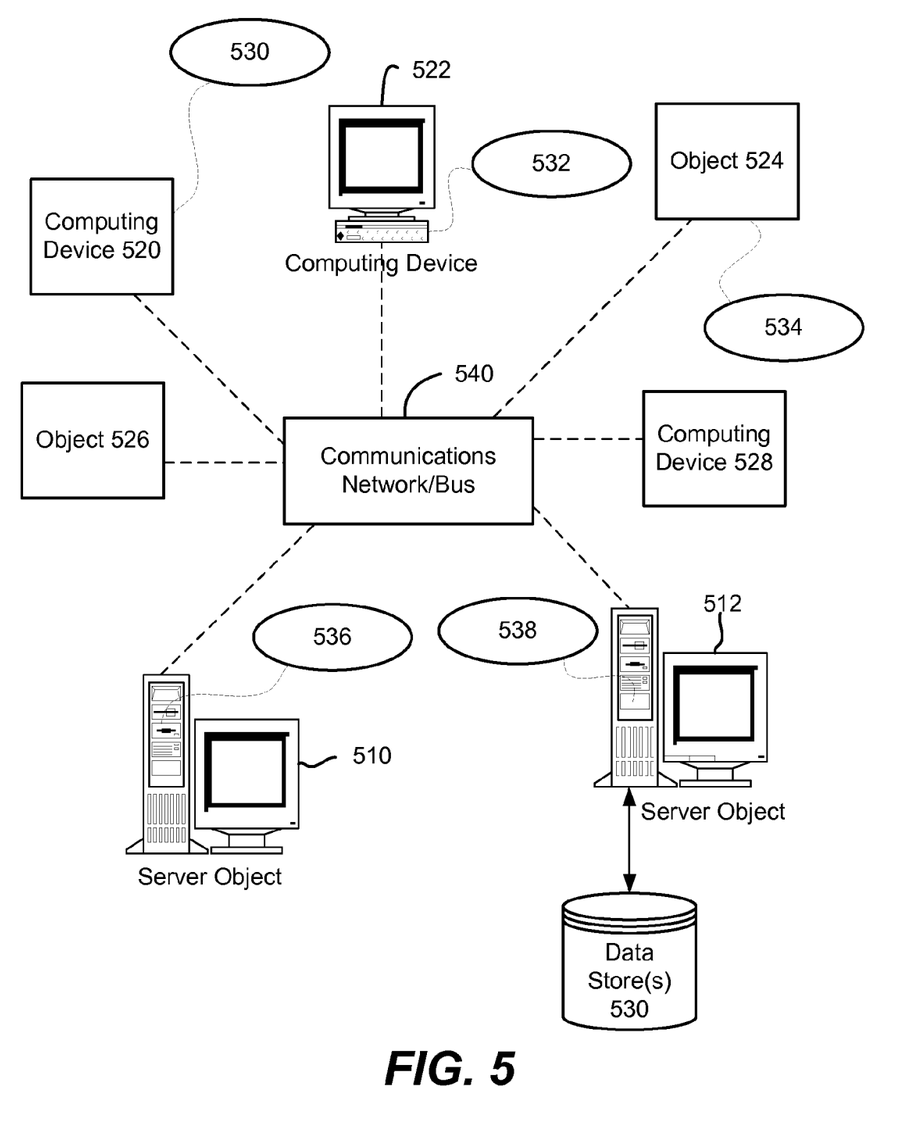
FIG. 5 is a block diagram representing exemplary non-limiting networked environments in which various embodiments described herein can be implemented.

FIG. 5 provides a schematic diagram of an exemplary networked or distributed computing environment. The distributed computing environment comprises computing objects 510, 512, etc., and computing objects or devices 520, 522, 524, 526, 528, etc., which may include programs, methods, data stores, programmable logic, etc. as represented by example applications 530, 532, 534, 536, 538. It can be appreciated that computing objects 510, 512, etc. and computing objects or devices 520, 522, 524, 526, 528, etc. may comprise different devices, such as personal digital assistants (PDAs), audio/video devices, mobile phones, MP3 players, personal computers, laptops, etc.

Each computing object 510, 512, etc. and computing objects or devices 520, 522, 524, 526, 528, etc. can communicate with one or more other computing objects 510, 512, etc. and computing objects or devices 520, 522, 524, 526, 528, etc. by way of the communications network 540, either directly or indirectly. Even though illustrated as a single element in FIG. 5, communications network 540 may comprise other computing objects and computing devices that provide services to the system of FIG. 5, and/or may represent multiple interconnected networks, which are not shown. Each computing object 510, 512, etc. or computing object or device 520, 522, 524, 526, 528, etc. can also contain an application, such as applications 530, 532, 534, 536, 538, that might make use of an API, or other object, software, firmware and/or hardware, suitable for communication with or implementation of the application provided in accordance with various embodiments of the subject disclosure.

There are a variety of systems, components, and network configurations that support distributed computing environments. For example, computing systems can be connected together by wired or wireless systems, by local networks or widely distributed networks. Currently, many networks are coupled to the Internet, which provides an infrastructure for widely distributed computing and encompasses many different networks, though any network infrastructure can be used for exemplary communications made incident to the systems as described in various embodiments.

Thus, a host of network topologies and network infrastructures, such as client/server, peer-to-peer, or hybrid architectures, can be utilized. The "client" is a member of a class or group that uses the services of another class or group to which it is not related. A client can be a process, e.g., roughly a set of instructions or tasks, that requests a service provided by another program or process. The client process utilizes the requested service without having to "know" any working details about the other program or the service itself.

In a client/server architecture, particularly a networked system, a client is usually a computer that accesses shared network resources provided by another computer, e.g., a server. In the illustration of FIG. 5, as a non-limiting example, computing objects or devices 520, 522, 524, 526, 528, etc. can be thought of as clients and computing objects 510, 512, etc. can be thought of as servers where computing objects 510, 512, etc., acting as servers provide data services, such as receiving data from client computing objects or devices 520, 522, 524, 526, 528, etc., storing of data, processing of data, transmitting data to client computing objects or devices 520, 522, 524, 526, 528, etc., although any computer can be considered a client, a server, or both, depending on the circumstances.

A server is typically a remote computer system accessible over a remote or local network, such as the Internet or wireless network infrastructures. The client process may be active in a first computer system, and the server process may be active in a second computer system, communicating with one another over a communications medium, thus providing distributed functionality and allowing multiple clients to take advantage of the information-gathering capabilities of the server.

In a network environment in which the communications network 540 or bus is the Internet, for example, the computing objects 510, 512, etc. can be Web servers with which other computing objects or devices 520, 522, 524, 526, 528, etc. communicate via any of a number of known protocols, such as the hypertext transfer protocol (HTTP). Computing objects 510, 512, etc. acting as servers may also serve as clients, e.g., computing objects or devices 520, 522, 524, 526, 528, etc., as may be characteristic of a distributed computing environment.

Exemplary Computing Device

As mentioned, advantageously, the techniques described herein can be applied to any device. It can be understood, therefore, that handheld, portable and other computing devices and computing objects of all kinds are contemplated for use in connection with the various embodiments. Accordingly, the below general purpose remote computer described below in FIG. 6 is but one example of a computing device.

Embodiments can partly be implemented via an operating system, for use by a developer of services for a device or object, and/or included within application software that operates to perform one or more functional aspects of the various embodiments described herein. Software may be described in the general context of computer executable instructions, such as program modules, being executed by one or more computers, such as client workstations, servers or other devices. Those skilled in the art will appreciate that computer systems have a variety of configurations and protocols that can be used to communicate data, and thus, no particular configuration or protocol is considered limiting.

Figure 6:
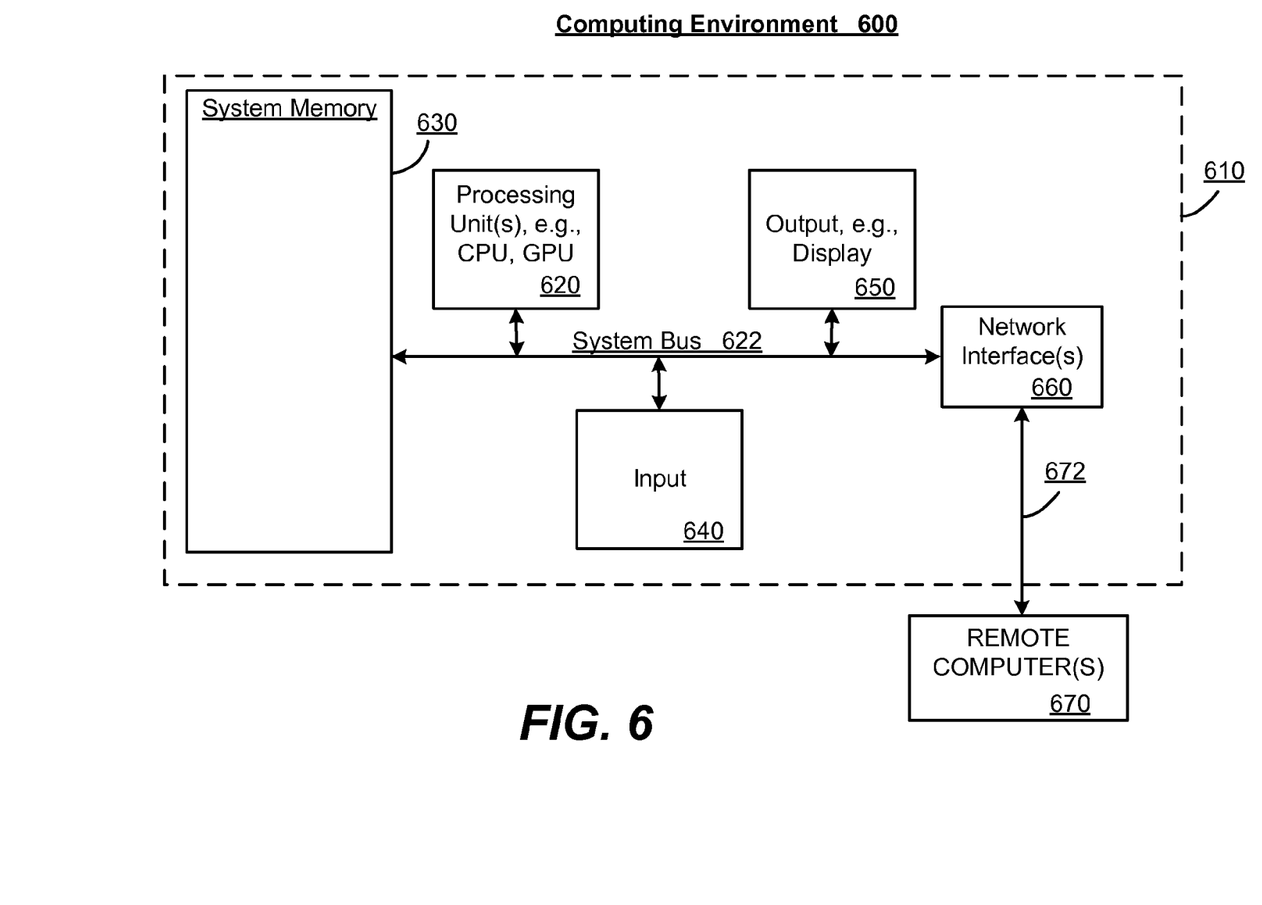
FIG. 6 is a block diagram representing an exemplary non-limiting computing system or operating environment in which one or more aspects of various embodiments described herein can be implemented.

FIG. 6 thus illustrates an example of a suitable computing system environment 600 in which one or aspects of the embodiments described herein can be implemented, although as made clear above, the computing system environment 600 is only one example of a suitable computing environment and is not intended to suggest any limitation as to scope of use or functionality. In addition, the computing system environment 600 is not intended to be interpreted as having any dependency relating to any one or combination of components illustrated in the exemplary computing system environment 600.

With reference to FIG. 6, an exemplary remote device for implementing one or more embodiments includes a general purpose computing device in the form of a computer 610. Components of computer 610 may include, but are not limited to, a processing unit 620, a system memory 630, and a system bus 622 that couples various system components including the system memory to the processing unit 620.

Computer 610 typically includes a variety of computer readable media and can be any available media that can be accessed by computer 610. The system memory 630 may include computer storage media in the form of volatile and/or nonvolatile memory such as read only memory (ROM) and/or random access memory (RAM). By way of example, and not limitation, system memory 630 may also include an operating system, application programs, other program modules, and program data.

A user can enter commands and information into the computer 610 through input devices 640. A monitor or other type of display device is also connected to the system bus 622 via an interface, such as output interface 650. In addition to a monitor, computers can also include other peripheral output devices such as speakers and a printer, which may be connected through output interface 650.

The computer 610 may operate in a networked or distributed environment using logical connections to one or more other remote computers, such as remote computer 670. The remote computer 670 may be a personal computer, a server, a router, a network PC, a peer device or other common network node, or any other remote media consumption or transmission device, and may include any or all of the elements described above relative to the computer 610. The logical connections depicted in FIG. 6 include a network 672, such local area network (LAN) or a wide area network (WAN), but may also include other networks/buses. Such networking environments are commonplace in homes, offices, enterprise-wide computer networks, intranets and the Internet.

As mentioned above, while exemplary embodiments have been described in connection with various computing devices and network architectures, the underlying concepts may be applied to any network system and any computing device or system in which it is desirable to improve efficiency of resource usage.

Also, there are multiple ways to implement the same or similar functionality, e.g., an appropriate API, tool kit, driver code, operating system, control, standalone or downloadable software object, etc. which enables applications and services to take advantage of the techniques provided herein. Thus, embodiments herein are contemplated from the standpoint of an API (or other software object), as well as from a software or hardware object that implements one or more embodiments as described herein. Thus, various embodiments described herein can have aspects that are wholly in hardware, partly in hardware and partly in software, as well as in software.

The word "exemplary" is used herein to mean serving as an example, instance, or illustration. For the avoidance of doubt, the subject matter disclosed herein is not limited by such examples. In addition, any aspect or design described herein as "exemplary" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used, for the avoidance of doubt, such terms are intended to be inclusive in a manner similar to the term "comprising" as an open transition word without precluding any additional or other elements when employed in a claim.

As mentioned, the various techniques described herein may be implemented in connection with hardware or software or, where appropriate, with a combination of both. As used herein, the terms "component," "module," "system" and the like are likewise intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on computer and the computer can be a component. One or more components may reside within a process and/or thread of execution and a component may be localized on one computer and/or distributed between two or more computers.

The aforementioned systems have been described with respect to interaction between several components. It can be appreciated that such systems and components can include those components or specified sub-components, some of the specified components or sub-components, and/or additional components, and according to various permutations and combinations of the foregoing. Sub-components can also be implemented as components communicatively coupled to other components rather than included within parent components (hierarchical). Additionally, it can be noted that one or more components may be combined into a single component providing aggregate functionality or divided into several separate sub-components, and that any one or more middle layers, such as a management layer, may be provided to communicatively couple to such sub-components in order to provide integrated functionality. Any components described herein may also interact with one or more other components not specifically described herein but generally known by those of skill in the art.

In view of the exemplary systems described herein, methodologies that may be implemented in accordance with the described subject matter can also be appreciated with reference to the flowcharts of the various figures. While for purposes of simplicity of explanation, the methodologies are shown and described as a series of blocks, it is to be understood and appreciated that the various embodiments are not limited by the order of the blocks, as some blocks may occur in different orders and/or concurrently with other blocks from what is depicted and described herein. Where non-sequential, or branched, flow is illustrated via flowchart, it can be appreciated that various other branches, flow paths, and orders of the blocks, may be implemented which achieve the same or a similar result. Moreover, some illustrated blocks are optional in implementing the methodologies described hereinafter.

CONCLUSION

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

In addition to the various embodiments described herein, it is to be understood that other similar embodiments can be used or modifications and additions can be made to the described embodiment(s) for performing the same or equivalent function of the corresponding embodiment(s) without deviating therefrom. Still further, multiple processing chips or multiple devices can share the performance of one or more functions described herein, and similarly, storage can be effected across a plurality of devices. Accordingly, the invention is not to be limited to any single embodiment, but rather is to be construed in breadth, spirit and scope in accordance with the appended claims.

What is claimed is:

1. In a computing environment, a system, comprising;
    a memory coupled to a bus system, in which the memory includes computer useable program code and an aspected container comprising methods and data; and
    one or more processing units, in which the one or more processing units execute the container methods and the computer useable program code to interface with the aspected container, the aspected container including an exclusive interface, a read-only interface and a shared-write interface to a common set of data, in which the aspected container is configured to not permit improper data access, including that the exclusive interface, the read-only interface and the shared-write interface are based upon use case and interface pairings that provide method call blocking by code within the aspected container, and that the set of methods for the read-only interface and the shared-write interface are internally synchronized and concurrency safe, and in which the for the read-only interface synchronization occurs at the interface level to allow multiple interface methods to be invoked concurrently with no synchronization overhead at the method level.

2. The system of claim 1 wherein the the shared-read-only interface has memory barriers removed.

3. The system of claim 1 wherein the shared-write interface is configured to have synchronization provided at the method level.

4. The system of claim 1 wherein the shared-write interface includes one or more method calls that modify a vector lock state.

5. The system of claim 1 wherein the method call blocking includes that while a concurrent writer is interfacing with the aspected container via the shared-write interface, access is blocked to methods called via the exclusive interface.

6. The system of claim 5 further comprising a mechanism for tracking references to holders of the shared-write interface to determine when to allow access via the exclusive interface.

7. The system of claim 1 wherein while a concurrent writer is interfacing via the shared-write interface, access is allowed to methods called by a concurrent reader.

8. The system of claim 1 wherein the method call blocking includes that when a method is invoked via the exclusive interface, access is blocked to methods called via the shared-write interface and to methods called via the read-only interface.

9. The system of claim 1 wherein no locking occurs when a method is invoked via the exclusive interface.

10. The system of claim 1 wherein when a method is invoked via the read-only interface, the method call blocking includes that access is blocked to methods called via the shared-write interface and to methods called via the exclusive interface.

11. The system of claim 10 further comprising a mechanism within the aspected container for tracking references to a number of holders of the read-only interface to determine when to allow access via another interface.

12. The system of claim 1 wherein no locking occurs when a method is invoked via the read-only interface.

13. The system of claim 1 wherein the aspected container comprises an aspected vector container.

14. The system of claim 1 wherein the aspected container comprises an aspected stack container, an aspected queue container or an aspected map container.

15. In a computing environment, a computer-implemented method performed at least in part on at least one processor, comprising:
   calling a method of an object, in which the object contains an exclusive interface, a read-only interface and a shared-write interface, and in which the object comprises at least one of an aspected stack container, an aspected queue container, or an aspected map container;
   blocking any call to the read-only interface or to the shared-write interface if the exclusive interface is in use as a result of the calling;
   blocking, via code within the object, any call to the exclusive interface or to the shared-write interface if the read-only interface is in use as a result of the calling; and
   blocking, via code within the object, any call to the exclusive interface if the shared-write interface is in use as a result of the calling.

16. The computer-implemented method of claim 15 further comprising, performing reference counter tracking via a mechanism within the object to determine whether the shared-write interface is in use.

17. The computer-implemented method of claim 15 further comprising, performing reference counter tracking via a mechanism within the object to determine whether the read-only interface is in use.

18. One or more computer storage memories having stored thereon a data structure, comprising, a set of interfaces to a common set of data, including an exclusive interface, a read-only interface, and a shared-write interface, each interface providing access to a plurality of methods, including non-concurrency safe methods associated with the exclusive interface, and only concurrency safe methods associated with the shared-write interface, in which access to the data via any other interface is blocked by a mechanism when the exclusive interface is in use, access to the data via the exclusive interface is blocked by a mechanism within the data structure when the shared-write interface is in use, and access to the data via the exclusive interface and the concurrent writer is blocked by a mechanism within the data structure when the read-only interface is in use.

19. The one or more computer storage memories of claim 18 wherein the data structure comprises an aspected vector container, an aspected stack container, an aspected queue container or an aspected map container.

* * * * *